July 19, 1949.　　　K. F. SOHR　　　2,476,633
FISHING FLOAT
Filed March 8, 1946
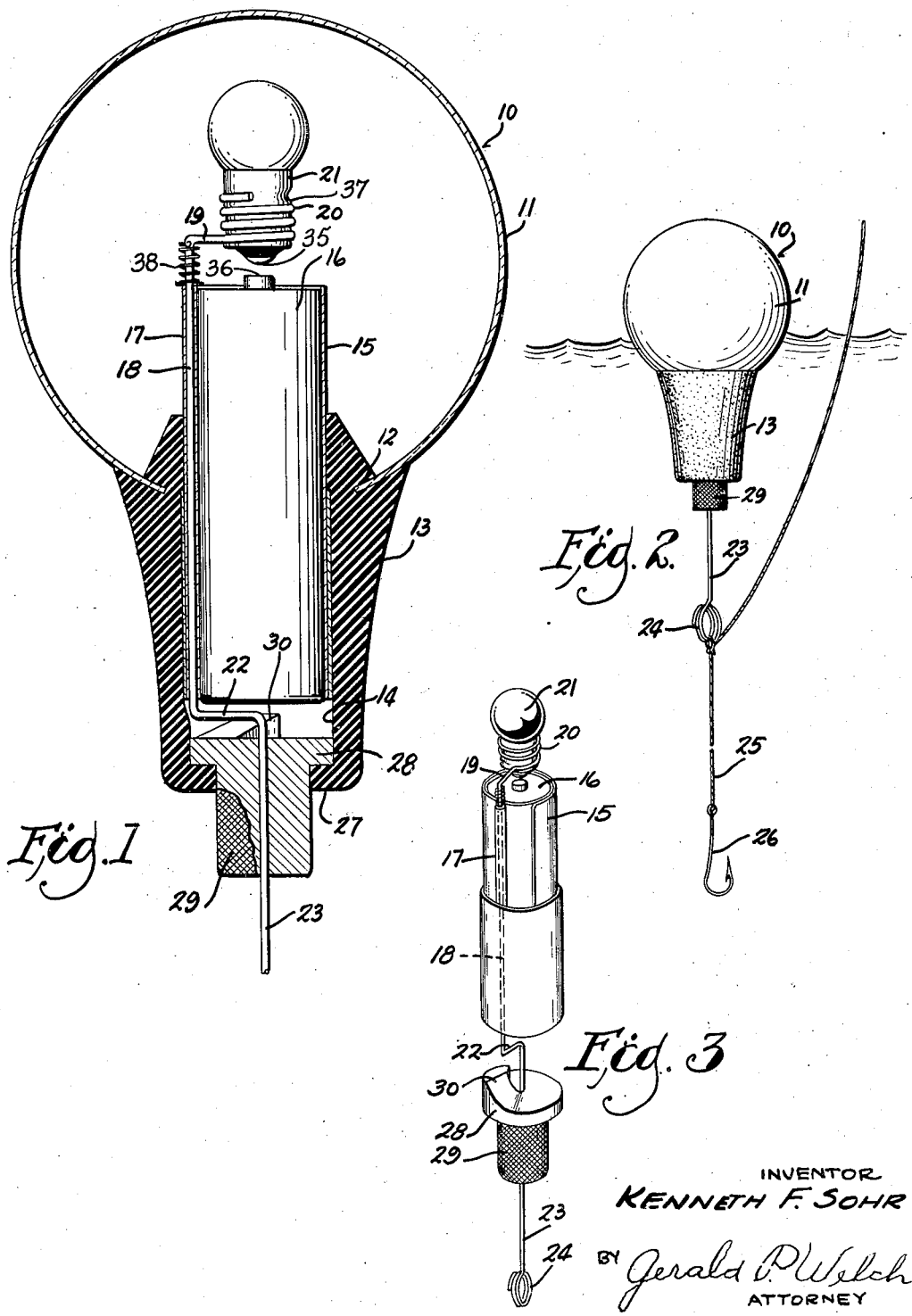
INVENTOR
KENNETH F. SOHR
BY Gerald P. Welch
ATTORNEY Patented July 19, 1949

2,476,633

UNITED STATES PATENT OFFICE 2,476,633

FISHING FLOAT

Kenneth F. Sohr, Racine, Wis., assignor to Gordon R. Sohr and Frederick F. Sohr, Racine, Wis.

Application March 8, 1946, Serial No. 652,873

3 Claims. (Cl. 43—17)

This invention relates to improvements in fishing floats and more particularly to a novel fishing float of the type employing an electric signal light.

An object of the invention is to provide a device of the type which is simple and effective in operation and economical of manufacture.

Another object of the invention is to provide means in a device of the type for rendering the electric light signal operative or inoperative, as may be desired during use of the device.

Other and further objects of the invention will be apparent as the description proceeds, reference being had to the accompanying drawing, in which:

Fig. 1 is a side view partly in elevation and partly in section of a fishing float embodying my invention.

Fig. 2 is a side view in elevation of the device in use.

Fig. 3 is a perspective view of parts of the device.

Referring more particularly to the drawing, the numeral 10 refers to the device generally, having a buoyant and translucent globe 11, held in an accommodating slot 12 in a rubber plug member 13, the latter having a longitudinal central bore at 14 thereof to accommodate the tubular casing 15 which retains a cylindrical battery 16.

The casing 15 is provided with a longitudinally extending sleeve 17 at one side thereof, which accommodates the pull rod 18. The rod 18 at its upper end has an angular off-set 19 which terminates in a coil 20, which latter is adapted to receive and retain a suitable electric light bulb 21. The rod 18 passes down through sleeve 17 and adjacent the lower end thereof has an angular bend 22 terminating in a downwardly directed portion 23 which is bottomed by a loop 24 which is provided for the convenient attachment of a fishing line 25 retaining the usual hook 26.

The rubber plug 13 has at its lowermost point an inwardly directed flange 27 which retains the cam element 28, comprising the thumb grip 29 and the integral cam element 30.

In use, the fishing line 25 is fastened in the loop 24 of the device 10 an appropriate distance from the hook 26. If the thumb grip 29 has been turned to the right so that cam 30 will bear upwardly against the horizontal portion of rod 18 at the bend 22 thereof, it will be apparent that said cam will prevent downward movement of rod 18 with the result that a light signal will be prevented and the float 10 may be used as for day fishing in the manner of a conventional fishing float. If, however, the cam 30 be moved backwardly from the rod so as to present no interference, a tug on the hook 26 and line 25 as by a fish bite, will pull rod 18 downwardly a limited distance through sleeve 17 to effect a contact of the lamp terminal 35 with the battery terminal 36, thus completing a circuit which runs through the battery into casing 15 and sleeve 17, through rod 18 into coil 20, through the threaded contact member 37 of lamp 21, and through the filament of the latter into the terminal 35 and the battery terminal 36, causing the lamp to light up. As the tug on the hook 26 and the line 25 is released, the coil spring 38 will expand to raise the rod 18, thus breaking the contact of terminals 35 and 36.

It will be understood that the device is capable of many modifications in structure and design, without departing from the spirit of the invention, within the scope of the appended claims.

Having thus described my invention, what I claim and desire to secure by Letters Patent of the United States, is:

1. A fishing float comprising a buoyant globe provided with a single opening, a resilient plug engaged therein and having a longitudinal bore, a cylindrical conductor casing held in said bore, a rotatable element held in said bore under said casing, a cam on the upper surface of said element a longitudinal sleeve disposed exteriorly of said casing, a rod adapted for limited movement in said sleeve, said rod having a coil formation in the upper end thereof adapted to hold a light bulb, a battery held in said casing with the contact terminal thereof disposed upwardly, said rod having a bend in the lower portion thereof adapted to be held by said cam to prevent downward movement of said light bulb into contact with said battery terminal.

2. A fishing float comprising a hollow globe having an opening therein, a plug engaged therein having a longitudinal bore, a cylindrical metal casing held in the upper part of said bore, a coaxially rotatable cam element held in said bore under said casing, an integral longitudinal sleeve disposed exteriorly on said casing, a rod longitudinally movable in said sleeve, a battery held in said casing, said rod having a coil in the upper end thereof forming a socket, an electric light bulb engaged therein, and said rod having a bend in the lower portion thereof, said cam being movable against said bend by rotation of the element to restrain downward movement of said rod and prevent closing of the electrical circuit.

3. A fishing float comprising a buoyant globe having a circular opening therein, a resilient plug having a longitudinal bore therethrough and an annular exterior slot receiving the margin of the circular opening in said globe, a cylindrical metal casing fitted within the upper portion of said bore, an annular reduced portion forming a shoulder at the lower end of said bore, a rotatable plug within the lower end of said bore and spaced from said casing, an enlarged portion of said plug bearing on said shoulder, a cam element integral on the upper surface of said enlarged portion, a battery held upright in said casing, a longitudinal sleeve integral with said casing, a wire rod mounted for limited reciprocal movement therein, an electric light bulb, said rod having an off-set coil in the upper end thereof forming a socket to retain said light bulb, said rod having an off-set portion in the lower end thereof engageable by said cam to prevent lowering of said rod and consequent contact of said bulb with said battery to close a circuit, and spring means for normally maintaining said rod in raised position.

KENNETH F. SOHR.

REFERENCES CITED

The following references are of record in the file of this patent:

UNITED STATES PATENTS

| Number | Name | Date |
| --- | --- | --- |
| 1,347,423 | Vince | July 20, 1920 |
| 1,707,901 | Bubb et al. | Apr. 2, 1929 |
| 2,201,588 | Kuhns | May 12, 1940 |
| 2,217,565 | Seigle et al. | Oct. 8, 1940 |
| 2,280,457 | Sutcliffe | Apr. 21, 1942 |